Figure 9:
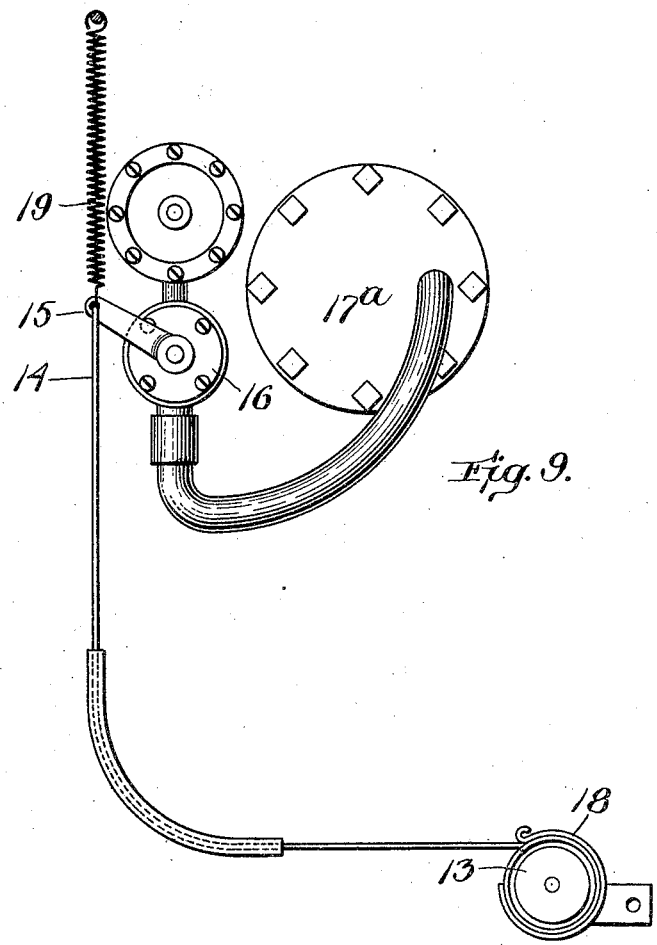

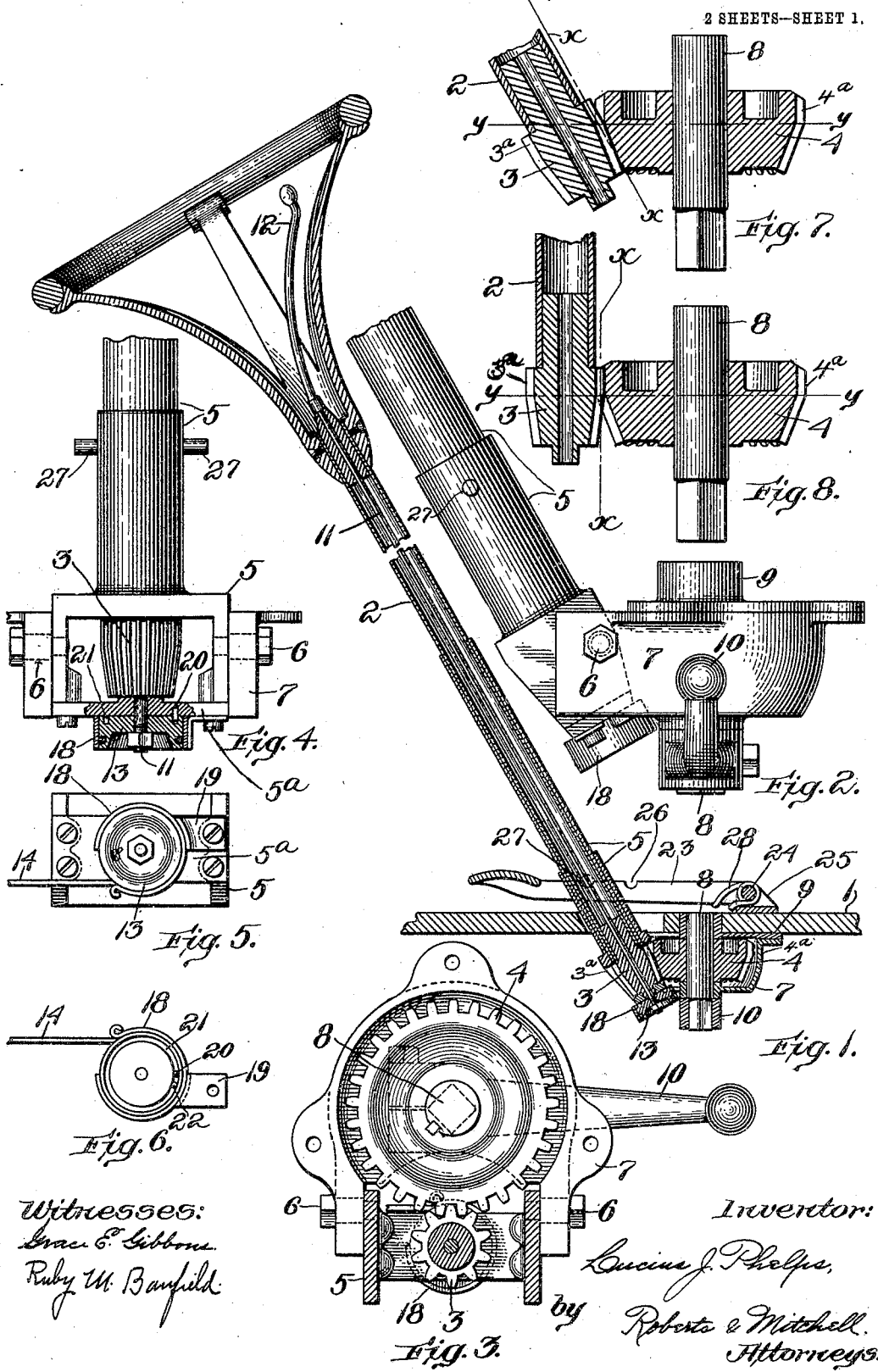

No. 793,468.

Patented June 27, 1905.

UNITED STATES PATENT OFFICE.

LUCIUS J. PHELPS, OF STONEHAM, MASSACHUSETTS, ASSIGNOR TO PHELPS MOTOR VEHICLE COMPANY, OF STONEHAM, MASSACHUSETTS, A CORPORATION OF MAINE.

STEERING MECHANISM FOR MOTOR-PROPELLED VEHICLES.

SPECIFICATION forming part of Letters Patent No. 793,468, dated June 27, 1905.

Application filed August 15, 1904. Serial No. 220,729.

*To all whom it may concern:*

Be it known that I, LUCIUS J. PHELPS, a citizen of the United States, and a resident of Stoneham, in the county of Middlesex and State of Massachusetts, have invented new and useful Improvements in Steering Mechanisms for Motor-Propelled Vehicles, of which the following is a specification.

My invention relates to steering mechanisms for motor-propelled vehicles.

Many motor-propelled vehicles are equipped with steering devices which comprise a rigid post extending up through the floor of the vehicle in front of the seat, provided at its upper end usually with a comparatively large hand-wheel, by which the post is turned, and at its lower end with a crank-arm connected with the front wheels of the vehicle. In order that the hand-wheel at the upper end of the post be conveniently positioned with respect to the seat of the vehicle and in order that the lower end of the post be clear of the legs and feet of the operator, it is customary to incline the post toward the seat. An objection to the construction described has been that the rigid post made it very inconvenient for persons to enter the vehicle, move about, or leave it—that is, the rigid post with its large hand-wheel, has been found very much in the way of persons moving about within the vehicle, and there have been several devices contrived with a view to overcoming this difficulty.

My invention has for its object to improve the construction of steering mechanisms for motor-propelled vehicles, and particularly to obviate the above-noted disadvantages incident to the old construction without impairing the general utility of the steering-gear.

My improved steering mechanism comprises a gear journaled on a fixed support, such as the body of a motor-propelled vehicle, and adapted to be connected with the wheels or other steering device of the vehicle, a steering-post carrying a gear meshing with the gear on the fixed support, and a frame on which the steering-post is mounted with provision for rotation on its own axis, said frame being pivotally supported to swing to a limited extent on an axis crosswise of the post and intersecting the gears at such a point as to prevent disengagement or binding of the gears when said frame is swung on said axis. The gears are preferably bevel-gears, and the axis for the post-carrying frame is preferably located in the same plane with and tangent to the larger ends of the pitch-cones of the two beveled gears, and therefore at one end of and perpendicular to the line of contact between the two pitch-cones. By this construction the steering-post can be swung on the axis referred to from its normal inclined operative position, where it is in the way of persons moving about within the vehicle, into a vertical and out-of-the-way position without disengaging the gears. Another important and practical advantage to this construction is that the operator can adjust the inclination of the steering-post within limits to what he may desire or require in order to conveniently manage the vehicle and without affecting the operation of the mechanism.

In the best form of my invention the steering-post is hollow and within it is journaled a shaft equipped at its upper end with a handle and adapted at its lower end to be connected with and control the engine of the vehicle by rotation of said shaft. In order to prevent rotation of this shaft with the steering-post, as well as to hold the shaft in adjusted position, a clutch or brake is provided connecting the shaft with the pivotal support for the steering-post. This brake allows the shaft to be turned, but holds said shaft in adjusted position and prevents accidental movement thereof.

Other features of my invention are hereinafter pointed out.

In the accompanying drawings, Figure 1 is a sectional elevation of part of a steering mechanism constructed in accordance with my invention. Fig. 2 is a side view of the lower portion of the mechanism shown in Fig. 1. Fig. 3 is a plan view, partly in section, of the lower portion of the mechanism shown in Fig. 1. Fig. 4 is a rear elevation, partly in section, of the pivoted frame hereinafter described, by which the steering-post is supported. Fig. 5 is a view of the under side of the pivoted frame shown in Fig. 4. Fig. 6 is a plan view of the sheave hereinafter described. Figs. 7 and 8 show how the steering-post swings on an axis intersecting the two gears hereinafter described. Fig. 9 is a view more or less diagrammatic showing how the sheave of Figs. 4, 5, and 6 is connected with the carbureter of the engine of a motor-propelled vehicle.

Having reference to the drawings, 1 represents in section a portion of the floor of a motor-propelled vehicle, in this case a carriage driven by a gas-engine.

2 is the steering-post, to the lower end of which is fixed a beveled gear 3, meshing with a beveled gear 4. Post 2 is journaled in a frame 5, pivotally connected at 6 6 to a gear-case 7, fastened to the under side of floor 1. Gear 4 is fast to an arbor 8, journaled near its lower end in gear-case 7 and at its upper end in a cap 9 for the gear-case which is interposed between the latter and floor 1. The lower squared end of arbor 8 projects below gear-case 7 and has fixed to it a crank-arm 10, connected in the usual manner (not shown) with the steering-wheels of the vehicle, so that rotation of post 2 acts through gears 3 and 4 and arbor 8 to swing arm 10 and the wheels connected with the latter. The teeth of the beveled gears 3 and 4 are at the larger ends of said gears extended parallel with the axis of the latter, so as provide spur-gears $3^a$ and $4^a$, integral with years 3 and 4, respectively.

The axis of the pivots 6 6 is in the same plane with and tangent to the larger ends of the pitch-cones of the two gears 3 and 4 and intersects one end of the line of contact between the two pitch-cones. This axis is located in Figs. 7 and 8 at the intersection of the line $x$ $x$ with the line $y$ $y$. It will thus be seen that post 2, gears 3, and frame 5 can be swung on the pivots 6 6 from the position shown in Fig. 7 to that shown in Fig. 8 without disengaging or cramping the two gears 3 and 4 and that when post 2 is in either of those two positions or any intermediate inclined position said post and the two gears can be freely rotated to swing arm 10 and steer the vehicle.

The purpose of providing the spur-gear extensions $3^a$ and $4^a$ at the larger ends of the two beveled gears 3 and 4 is to give the required strength to the gears when post 2 occupies the position shown in Fig. 8, for while the ends of the teeth at the top of the beveled portions 3 and 4 are still in mesh when post 2 occupies the position shown in Fig. 8, yet the intermeshing portions of the teeth of the beveled gears are so small that I prefer to reinforce them by providing them with spur-gear extensions $3^a$ and $4^a$. In some cases, however, these extensions $3^a$ and $4^a$ may not be necessary. It is very convenient also to have the steering-post gear in mesh when the post is in vertical position, as well as when more or less inclined.

Post 2 and gear 3 are herein shown as hollow to receive a shaft 11, provided at its upper end with a handle 12 and carrying at its lower end a wheel or sheave 13. To sheave 13 is made fast one end of a flexible cord 14, connected with the adjusting member 15 of the carbureter 16 of a gas-engine $17^a$, by which the vehicle is propelled. Sheave 13 is embraced and gripped by a strap 18, made with a lug 19, fastened to the bottom cross-bar $5^a$ of frame 5. This strap 18 serves as a frictional clutch or brake to hold shaft 11 in whatever position it may be placed.

Rotation of shaft 11 in one direction winds cord 14 onto sheave 12 and shifts the adjusting member 15 of carbureter 16 in one direction against the pull of spring 19, while rotation of shaft 11 in the opposite direction allows spring 19 to shift the adjusting member 15 of carbureter 16 in the opposite direction, the cord 14 unwinding from sheave 13.

In order to limit movement of shaft 11 in both directions, a pin 20 is provided projecting from the under side of cross-bar $5^a$ into an annular groove 21, formed in the upper face of sheave 13. In this groove 21 is fixed a pin 22, which by engagement with pin 20 limits movement of shaft 11 to about one revolution, enough to shift member 15 from one extreme position to the opposite.

The flexibility of cord 14 and the direction in which it leads from sheave 13 allows of free swinging movement of post 2 without disturbing the position of member 15.

In order to hold post 2 in either its vertical or its inclined position, a spring-pressed latch 23 is provided, pivoted at 24 to a bracket 25, fast to floor 1. This latch 23 straddles the post and is made with notches 26 to engage lugs 27 on frame 5, and thereby lock the post in either its vertical or inclined position. The latch is normally held in engagement with lugs 27 by spring 28 and is intended to be disengaged from said lugs by the foot of the operator.

My improved steering mechanism is compact and strong and has the advantage that it can be shifted into an out-of-the-way position when not in use. In all its positions it is operative. Vibrations of the vehicle are not transmitted to the hand of the operator or as much as heretofore, and the inclination of the post 2 can be adjusted to suit the operator.

By having the carbureter-controlling shaft 11 carried by and mounted within post 2 it is not only shielded at all times, but is carried with said post when the latter is shifted on the pivot 6 6, so that the handle of said shaft is always in a position convenient to the operator.

While I have herein shown ordinary bevel-gears having a straight taper, it is obvious that gears having other forms of taper can be substituted for the beveled gears shown.

What I claim is—

1. A steering mechanism for vehicles comprising a gear and connections therewith to the vehicle-wheels, a steering-post, a gear on the steering-post in mesh with the first-named gear, a frame on which the steering-post is mounted to turn on its own axis, said frame pivotally connected to a support, and the support, the axis on which said frame swings being transverse to the steering-post axis, and practically tangent to the pitch-surfaces of both gears.

2. A steering mechanism for vehicles comprising a tapered gear and connections therewith to the vehicle-wheels, a steering-post, a second tapered gear fixed to the steering-post in mesh with the first-named tapered gear, a frame on which the steering-post is mounted to turn on its own axis, said frame pivotally connected to a support, and the support, the axis on which said frame swings being transverse to the steering-post axis and practically tangent to the pitch-surfaces of both gears.

3. A steering mechanism for vehicles comprising a gear partly spur and partly tapered, and connections therewith to the vehicle-wheels, a steering-post; a second gear, partly spur and partly tapered, fixed to the steering-post, and in mesh with the first-named gear, a frame on which the steering-post is mounted to turn on its own axis, said frame pivotally mounted to a support, and the support, the axis on which said frame swings being transverse to the steering-post axis and practically tangent to the two pitch-circles formed by the junction of the pitch cylinders and cones of the respective gears.

4. A steering mechanism for vehicles comprising a beveled gear and connections therewith to the vehicle-wheels, a steering-post, a beveled gear fixed to the steering-post and in mesh with the first-named beveled gear, a frame whereon the steering-post turns on its own axis, a support to which said frame is pivotally connected to swing to a limited extent on an axis crosswise of the post and intersecting the gears at a point which prevents disengagement of said gears, said bevel-gears having spur-gear extensions at their large ends to intermesh and reinforce the beveled gears when the post is swung in one direction.

5. A steering mechanism for motor-propelled vehicles comprising a beveled gear adapted to be connected with the wheels of the vehicle; a steering-post; a beveled gear fixed to the steering-post and meshing with the first-named beveled gear; a frame on which the steering-post is mounted to turn on its own axis, and a support to which said frame is pivotally connected to swing to a limited extent on an axis crosswise of the post in the same plane with and tangent to the larger ends of the pitch-cones of the two beveled gears.

6. A steering mechanism for motor-propelled vehicles comprising a beveled gear having at its larger end a spur-gear extension and adapted to be connected with the wheels of the vehicle; a steering-post; a beveled gear fixed to the steering-post having at its larger end a spur-gear extension and meshing with the first-named gear; a frame on which the steering-post is mounted to turn on its own axis; and a support to which said frame is pivotally connected to swing to a limited extent on an axis crosswise of the post in the same plane with and tangent to the larger ends of the pitch-cones of the two beveled gears at the junction of said beveled gears with their respective spur-gear extensions.

7. In a steering mechanism for motor-propelled vehicles, the combination with a hollow steering-post and a support on which said post is mounted, of a shaft journaled within said post provided at its upper end with a handle and adapted at its lower end to be connected with the engine of the vehicle, and a brake connecting the shaft with the support for holding said shaft against rotary movement with the post.

8. In a steering mechanism for motor-propelled vehicles, the combination with a hollow steering-post and a support on which said post is mounted, of a shaft journaled within said post and provided at its upper end with a handle; a wheel mounted upon the lower end of said shaft; a brake on said support for engaging said wheel to hold said shaft against rotary movement with the post; a gas-engine, and a connection between the carbureter of the engine and said wheel.

9. In a steering mechanism for motor-propelled vehicles, the combination with a hollow steering-post and a support on which said post is mounted, of a shaft journaled within said post and provided at its upper end with a handle; a sheave mounted upon the lower end of said shaft; a brake on said support for engaging the sheave to hold the shaft against rotary movement with the post; a gas-engine; a cord connecting the carbureter of the engine with said sheave, and a spring connected with the carbureter and opposed to said cord.

10. A steering mechanism for motor-propelled vehicles comprising a gear adapted to be connected with the wheels of the vehicle; a steering-post; a gear fixed to the steering-post and meshing with the first-named gear; a frame on which the steering-post is mounted to turn on its own axis, a fixed support to which said frame is pivotally connected to swing to a limited extent on an axis crosswise of the post and intersecting the gear-teeth at a point which prevents disengagement of said gears, and a latch to hold the frame and post in adjusted position.

Signed by me at Boston, Massachusetts, this 4th day of August, 1904.

LUCIUS J. PHELPS.

Witnesses:
ROBERT CUSHMAN,
JOSEPH T. BRENNAN.